United States Patent
Ishio et al.

(10) Patent No.: US 6,312,834 B1
(45) Date of Patent: Nov. 6, 2001

(54) CLAD MATERIAL AND METHOD OF MANUFACTURING THE MATERIAL

(75) Inventors: Masaaki Ishio, Osaka; Yoshiki Takai, Amagasaki, both of (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/463,908

(22) PCT Filed: May 28, 1999

(86) PCT No.: PCT/JP99/02859

§ 371 Date: Feb. 2, 2000

§ 102(e) Date: Feb. 2, 2000

(87) PCT Pub. No.: WO99/62665

PCT Pub. Date: Dec. 9, 1999

(30) Foreign Application Priority Data

Jun. 3, 1998 (JP) .................................................. 10-172157

(51) Int. Cl.[7] .................. B32B 15/01; C21D 7/02
(52) U.S. Cl. .................. 428/685; 148/516; 148/530; 148/531; 148/532; 148/534; 428/653; 428/671; 428/676; 428/677; 428/679; 428/925; 428/926; 428/940
(58) Field of Search .................. 428/685, 671, 428/676, 677, 679, 925, 926, 940, 653, 516, 530, 531, 532, 534

(56) References Cited

U.S. PATENT DOCUMENTS 5,576,113 * 11/1996 Hirofumi et al. ..................... 428/679

FOREIGN PATENT DOCUMENTS

| | | | | |
|---|---|---|---|---|
| 62-124229-A | * | 6/1987 | (JP) | ..................................... 148/534 |
| 06-336619-A | * | 12/1994 | (JP) | ............................... C22C/38/00 |
| 07-268462-A | * | 10/1995 | (JP) | ............................... C22C/38/00 |
| 08-141754-A | * | 6/1996 | (JP) | ............................... B32B/15/01 |

* cited by examiner

*Primary Examiner*—Robert R. Koehler
(74) *Attorney, Agent, or Firm*—Dykema Gossett PLLC

(57) ABSTRACT

The present invention, which is aimed at providing a method for manufacturing a clad material that can be used for the anode cases and cathode cases of button-type microbatteries and other miniature electronic devices requiring the use of comparatively thin, drawable sheets, allows the difference between r values, or Lankford values (which characterize the plastic anisotropy between the rolling/bonding direction of a clad material and a direction at a prescribed angle to the rolling/bonding direction) to be reduced by preforming cold rolling at a reduction of 30% or lower in addition to performing a conventional method for manufacturing a clad material, making it possible to substantially enhance the mechanical strength of the clad material and to mass-produce clad materials that have low reduction anisotropy.

9 Claims, 7 Drawing Sheets

CLAD MATERIAL AND METHOD OF MANUFACTURING THE MATERIAL

TECHNICAL FIELD

The present invention relates to a readily drawable clad material having excellent tensile strength and other mechanical strength characteristics and to a manufacturing method therefor and, in particular, makes it possible to provide a clad material for the anode cases or cathode cases of button-type microbatteries, cases for quartz oscillators, cases for various other electronic components, and other types of miniature electronic equipment that require deep drawability.

BACKGROUND ART

Clad materials obtained by bonding a plurality of metals through rolling are integrated materials that preserve the characteristics of individual, metals, and are hence extremely useful in applications in which a plurality of characteristics must be provided at the same time.

For example, cases for button-type microbatteries must have the desired mechanical strength, drawability, corrosion resistance, low contact resistance, and the like. CU/SUS (stainless steel)/Ni, Cu/Fe/Ni, and other clad materials are used for anode cases; and Ni/SUS, Ni/SUS/Ni, Al/SUS/Ni, and other clad materials are used for cathode cases.

In addition, Ni/Fe/Ni, Ni/SUS/Ni, Cu/SUS/Ni, Cu/Fe/Ni, and other clad materials are used for the cases of various electronic components that have specific requirements concerning mechanical strength, drawability, corrosion resistance, weldability, and the like.

Clad materials that function as base materials for such cases are commonly obtained by superposing a plurality of metal sheets constituting a clad material, bonding these sheets by cold rolling, homogenizing the sheets, and subjecting them to finish cold rolling or a combination of finish cold rolling and final annealing. The product may be optionally cut into prescribed lengths.

Clad materials obtained by the aforementioned manufacturing method are molded into cup shapes by conventional deep drawing, making it possible to obtain cases designed for various applications and fashioned to specific dimensions.

For example, miniaturization of cases for the aforementioned button-type microbatteries becomes crucial because of the need for smaller and lighter devices in the field of electrical equipment.

Specifically, demand for thinner clad material increases because of the need to design cases for smaller button-type microbatteries that have higher capacity and longer life. Conventionally at about 0.2~0.3 mm, device thickness is currently being reduced to about 0.1~0.15 mm.

It has been confirmed that conventional manufacturing methods make it difficult to perform deep drawing as desired even when the goal is limited to obtaining a thin clad material. Specifically, the inventors have performed experiments and confirmed that an attempt to obtain a clad material by a conventional manufacturing method results in a high Lankford value, or a considerable difference between r values (which characterize the plastic anisotropy between the rolling/bonding direction and a direction at a prescribed angle to the rolling bonding direction). In addition, deep drawing produces low roundness and yields an oval shape whose major axis is oriented in the rolling/bonding direction. In particular, cracks and ruptures form and a cup shape is difficult to obtain when a thin clad material is formed.

SUMMARY OF THE INVENTION

With the foregoing problems in mind, it is an object of the present invention to provide a readily drawable clad material having excellent tensile strength and other mechanical strength characteristics, and an manufacturing method therefore and, in particular, to a clad material suitable for use as an anode case or cathode case for button-type micro batteries and for other applications involving miniature electronic devices and requiring deep drawability and the use of comparatively thin sheets, and a manufacturing method therefor.

As a result of repeated experiments aimed at attaining the stated object, the inventors perfected the present invention upon discovering that the difference between r values (which characterize the plastic anisotropy between the rolling bonding direction of a clad material and a direction at a prescribed angle to the rolling/bonding direction) can be reduced by performing cold rolling at a rolling reduction of 30% or lower in addition to performing a conventional method for manufacturing a clad material, making it possible to substantially enhance the mechanical strength of the clad material and to mass-produce clad materials that have low reduction anisotropy.

Specifically, the present invention resides in a clad material characterized in that metal cladding is rolled/bonded to at least one principal surface of a metal substrate, and a value of less than 0.6 is set for the maximum difference between the r values (measured under 5% elongation) expressing the plastic anisotropy between the rolling/bonding direction, a direction at 45° to the rolling/bonding direction, and a direction at 90° to the rolling/bonding direction.

Another feature of the above-described clad material is that a value of 0.7 or greater is set for the r values that express the plastic anisotropy between the rolling/bonding direction, a direction at 45° to the rolling/bonding direction, and a direction at 90° to the rolling/bonding direction.

Yet another feature of the above-described clad material is that the combined thickness is set to 0.5 mm or less, and the thickness of the metal cladding is set to between 2 and 20% of the thickness of the metal substrate.

Still another feature of the above-described clad material is that the metal substrate is stainless steel and that the Goss {110}<100>-oriented accumulation in the plane in which bonding with the metal cladding is achieved is less than that observed when no metal cladding is rolled/bonded. An additional feature of the clad material is that the metal cladding is at least one material selected from copper and nickel.

The manufacturing method for obtaining the above-described clad material is characterized in that a clad material obtained by the rolling/bonding of metal cladding to at least one principal surface of a metal substrate is subjected to cold rolling at a rolling reduction of 30% or lower, and preferably 5 to 25%.

BRIEF DESCRIPTION OF THE DRAWINGS

FIG. 7 is a graph depicting the relation between the Euler angles and the orientation density, where

BEST MODE FOR CARRYING OUT THE INVENTION

Figure 1A:
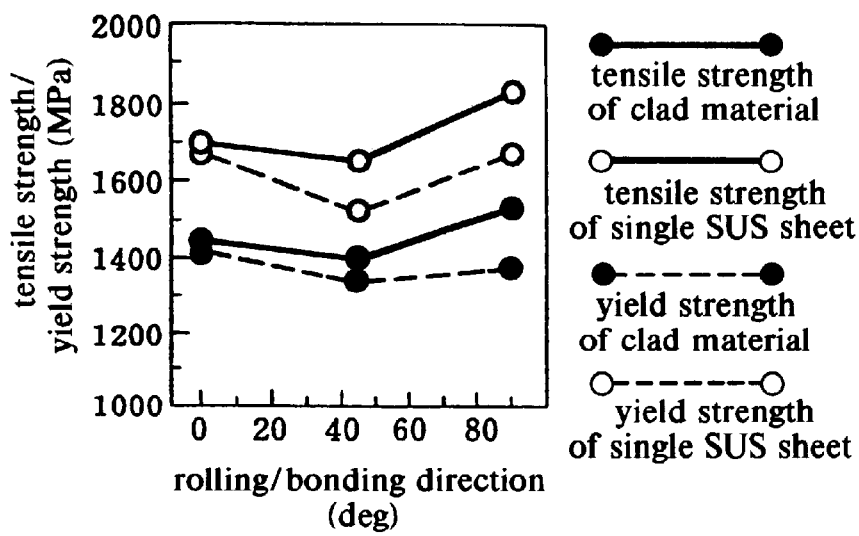
FIG. 1A depicts measurements obtained following cold rolling at a rolling reduction of 82%, FIG. 1B those obtained following final annealing, and FIG. 1C those obtained following cold rolling at a rolling reduction of 25%.

No particular restrictions are imposed on the properties of the metal substrate or metal cladding constituting the clad material of the present invention. As a result of experiments conducted by the inventors, it was confirmed that irrespective of the properties of the metal substrate and the metal cladding, the manufacturing method of the present invention yields lower reduction anisotropy as a result of the fact that the r value (which indicates the plastic anisotropy of the metal substrate itself) remains substantially constant in all rolling/bonding directions, and the non-uniformity of the r value is reduced, yielding an r value that remains substantially unchanged throughout the clad material, and ultimately making it possible to perform highly accurate deep drawing.

As follows from the below-described results of a study into the texture of surfaces along which clad materials comprising SUS (stainless steel) as the metal substrate and copper or nickel as the metal cladding are bonded to the metal cladding, the Goss {110}<100>-oriented accumulation is much less pronounced and orientation dispersion is comparatively high in comparison with a case in which no metal cladding is rolled/bonded. The formation of a texture having such comparatively pronounced orientation dispersion is believed to be the reason for the reduced non-uniformity of the r value.

Although the extent to which aggregation occurs in a specific orientation varies somewhat with the properties of the metal substrate, the texture of the entire clad material still has comparatively high orientation dispersion, and the same effect can be attained.

The metal cladding is not necessarily rolled/bonded to both principal surfaces of the metal substrate. The material should be selected according to the intended application and rolled/bonded to one or both principal surfaces. The above-described effect can thus be obtained for the principal surfaces of a metal substrate to which this clad material is rolled/bonded.

In particular, conventional stainless steel SUS (austenitic stainless steel, ferritic stainless steel, two-phase stainless steel, or precipitation-hardened stainless steel), iron, 30~55 wt % Ni—Fe, 20~60 wt % Ni—Cu, 25~50 wt % Ni-5~20 wt % Co—Fe, and the like should preferably be used as the metal substrates of clad materials for the anode cases or cathode cases of button-type microbatteries and other types of miniature electronic equipment because of considerations related to mechanical strength, thermal stability, consistency of thermal expansion coefficient, weldability, and the like. In addition, nickel, copper, aluminum, 5~30 wt % Cr—Ni, 20~60 wt % Ni—Cu, and the like should preferably be used as metal claddings because of considerations related to corrosion resistance, electrical resistance, bondability, and the like.

The metal substrate and metal cladding should preferably be different materials in order to make the effect of the present invention more pronounced.

The desired effect of the present invention can be obtained irrespective of the combined thickness of the clad material, but this material should preferably be used in applications having the above-described drawability and reduced thickness requirements in order to best utilize the effect of the present invention. The combined thickness of the clad material should be 0.5 mm or less, preferably 0.3 mm or less, and ideally 0.2 mm or less.

Although the thickness ratio of the metal substrate and metal cladding constituting the clad material is not subject to any particular limitations, it is preferable that the thickness of the metal cladding constitute no more than 2%, and preferably no more than 20%, of the thickness of the metal substrate in order to work the manufacturing method described below.

When metal cladding is rolled/bonded to both principal surfaces of a metal substrate, the desired effect can be obtained by satisfying the above-described conditions for the metal cladding rolled/bonded to at least one principal surface, although it is best for the metal cladding rolled/bonded to both principal surface to satisfy the aforementioned conditions. The effect of the present invention can be attained with maximum efficiency through suitable selection of the thickness ratio of the metal substrate and metal cladding in accordance with the combined required thickness of the clad material.

As referred to herein, the r values that characterize the plastic anisotropy between the rolling/bonding direction, a direction at 45° to the rolling/bonding direction, and a direction at 90° to the rolling/bonding direction are values measured by the method defined in ASTM-E517 and based on the use of samples cut in a direction parallel to each direction. The r values and elongation can be expressed by Eqs. 1 and 2 below $$r = \frac{\ln(w_0/w)}{\ln(LW/L_0 w_0)} \qquad \text{Eq. 1}$$

$$\text{Elongation} = \frac{L-L_0}{L_0} \times 100(\%) \qquad \text{Eq. 2}$$

where $w_0$ is the width of an undeformed sheet, w is the width of a deformed sheet, $L_0$ is the undeformed gage length, and L is the deformed gage length.

Specifically, the clad material obtained by a common method in accordance with the present invention is subjected to cold rolling at a rolling reduction of 30% or lower, so the clad material itself undergoes work hardening, and its elongation decreases. Commonly, the r values are measured at an elongation of 15~20%. In the present invention, the r values are measured at an elongation of 5%.

When a value of 0.6 or greater is set for the maximum difference between the resulting r values characterizng the plastic anisotropy in the rollinglbonding direction, a direction at 45° to the rolling/bonding direction, and a direction at 90° to the rolling/bonding direction, higher reduction anisotropy results, and the desired deep drawing cannot be performed. In particular, the aforementioned maximum difference between the r values should be set to 0.5 or lower in order to obtain highly accurate deep drawing.

Essentially, the higher the r value, the better the drawability, so a value of 0.7 or greater, and particularly 1.0 or greater, should be selected from within the above-described non-uniformity range for the rolling/bonding direction, a direction at 45° to the rolling/bonding direction, and a direction at 90° to the rolling/bonding direction.

Tensile strength and yield strength, which are used as standards for evaluating the metal substrate of the clad material of the present invention, are measured by the method described in JIS Z 2241. In particular, not only does the clad material of the present invention have higher tensile strength and yield strength than does a conventional clad material (as will become apparent from the embodiments described below), but the characteristics of the material remain substantially the same in any direction, irrespective of its relation to the rolling/bonding direction.

The above-described method for obtaining a clad material in accordance with the present invention is characterized in that a clad material obtained by the rolling/bonding of metal cladding to at least one principal surface of a metal substrate in the manner described above undergoes further cold rolling at a rolling reduction of 30% or lower.

A conventional manufacturing method comprises steps in which a plurality of metal substrates constituting a clad material are superposed, rolled/bonded in the cold state, homogenized, and subjected to finish cold rolling or a combination of finish cold rolling and final annealing.

The manufacturing method of the present invention can be performed such that a clad material subjected to the aforementioned finish cold rolling is then heat-treated within a prescribed temperature range and cold-rolled at a rolling reduction of 30% or lower, and the clad material that has undergone finish cold rolling and final annealing is merely cold-rolled at a rolling reduction of 30% or lower.

The initial rolling/bonding step is not limited to the aforementioned cold rollingtbonding, and the same effect can be obtained by adopting warm rolling/bonding or hot rolling/bonding. It is not always necessary to perform homogenizing and finish cold rolling, and the need for a particular step should be selected together with specific conditions or the like in accordance with the properties, thickness, and other attributes of the metal substrate and metal cladding.

It is also possible to perform scratching/brushing and other surface treatments prior to the final rolling/bonding step, to use a tension leveler for thickness readjustment or to perform other thickness-adjusting treatments following cold rolling at a rolling reduction of 30% or lower, or to add other conventional steps.

Specifically, a basic feature of the present invention is that the clad material is cold-rolled at a rolling reduction of 30% or lower during the final step of obtaining this material and that a heat treatment is optionally performed prior to the cold rolling. The present invention also encompasses arrangements in which the heat treatment and the cold rolling at the rolling reduction of 30% or lower are performed a plurality of times in accordance with the properties, thickness, and other attributes of the metal substrate and metal cladding.

The optionally performed heat treatment may be performed under the same conditions as the aforementioned fmal annealing, and optimum conditions should be selected in accordance with the properties, thickness, and other attributes of the metal substrate and metal cladding. The treatment is commonly performed within a range of 500 to 1100° C.

The rolling reduction during the above-described cold rolling must be kept at 30% or lower because when the rolling reduction exceeds 30%, excessively small elongation results, much lower drawability is established, and the difference (non-uniformity) between the r values reaches or surpasses 0.6. In particular, the r value in the rolling/bonding direction (0° direction) is 0.7 or lower. The rolling reduction should preferably be 5~30%, and particularly 5~25%, because mechanical strength is reduced and the difference (non-uniformity) between the r values reaches or surpasses 0.6 when the rolling reduction is made lower than necessary.

In addition, a metal cladding prevents a metal substrate from coming into direct contact with the work rolls of the rolling mill during the rolling/bonding of the metal cladding to the metal substrate and the subsequent rolling thereof, and is believed to improve texture formation by the plastic deformation of the metal substrate, functioning ag a so-called frictional buffer. Consequently, the thickness of the metal cladding should preferably constitute at least 2% of the thickness of the metal substrate. In addition, the thicknes of the metal cladding should commonly be selected at no more than 20% of the thickness of the metal substrate because making the metal cladding excessively thick causes the clad material to lose some of its mechanical strength as a whole.

EMBODIMENTS

The effect of the present invention will now be described through a the embodiments that follow.

Embodiment 1

A Cu/SUS/Ni clad material with a thickness of 0.15 mm was prepared as the clad material of the present invention. The SUS used as the metal substrate corresponded to SUS304 (JIS G 4307), the copper used as the metal cladding rolled/bonded to one principal surface corresponded to C1020 (JIS H 3100), and the nickel used as the metal cladding rolled/bonded to the other principal surface corresponded to VN/R (JIS H 4501). The ultimate thicknesses were as follows: 123 $\mu$m (82%) for the SUS, 24 $\mu$m (16%) for the copper, and 3 $\mu$m (2%) for the nickel. The numbers in parentheses following the $\mu$m units designate the thickness ratios.

The SUS (metal substrate), copper, and nickel (metal claddings) were prepared, and a three-layer clad material with a thickness of 1.1 mm was obtained by subjecting these components to cold rolling/bonding and homogenization. The material was then cold-rolled at a rolling reduction of 82%, subjected to final annealing at 1000° C., and cold-rolled at a rolling reduction of 25%, yielding the above-described clad material of the present invention.

To demonstrate the effect of the proposed clad material, a single SUS sheet used as a metal substrate was fabricated according to the same history as a comparison material.

The clad material of the present invention and the comparison material composed of a single SUS sheet were subjected to final annealing and cold rolling at a rolling reduction of 25%, and the resulting samples were used to measure tensile strength, yield strength, r values, and texture attributes.

Figure 1B:
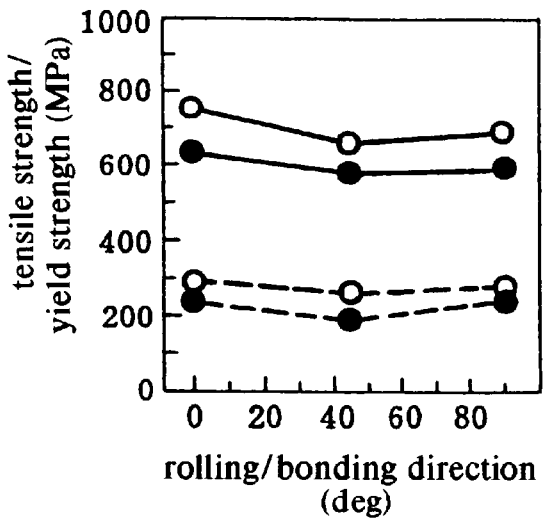
FIG. 1 is a graph depicting the relation between the yield strength, tensile strength, and angle with respect to the rolling/bonding direction, where
Figure 1C:
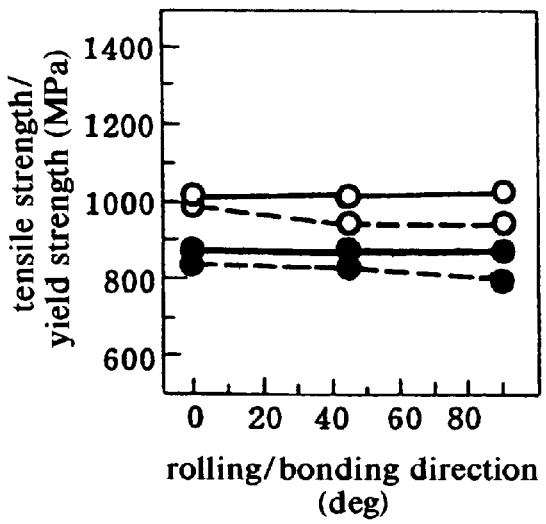

The vertical axes of the graphs in FIGS. 1A, 1B, and 1C indicate tensile strength and yield strength, and the horizontal axes indicate the angle with respect to the rolling/bonding direction (the angle of the direction parallel to the rolling/bonding direction is assumed to be 0° (deg.)). The solid lines between the black circles indicate the tensile strength of the clad material, the broken lines between the black circles indicate the yield strength of the clad material, the solid lines between the white circles indicate the tensile strength of the single SUS sheet, and the broken lines between the white circles indicate the yield strength of the single SUS sheet. In addition, FIG. 1A depicts measurements obtained following cold rolling at a rolling reduction of 82%, FIG. 1B those obtained following final annealing, and FIG. 1C those obtained following cold rolling at a rolling reduction of 25%.

The samples for measuring tensile strength and yield strength had the following measurements: a gage length of 50 mm, a width of 12.5 mm, and thicknesses of 0.2 mm (following cold rolling at a rolling reduction of 82% and final annealing) and 0.15 mm (following cold rolling at a rolling reduction of 25%).

It follows from the graph in FIG. 1 that the clad material of the present invention (see FIG. 1C) has higher tensile strength and yield strength than does the finish cold rolling following final annealing (see FIG. 1B), that these values are similar, and that the values in the rolling/bonding direction (0° direction), a direction at 45° to the rolling/bonding direction, and a direction at 90° to the rolling/bonding direction are substantially the same and vary only slightly. It can thus be confirmed that the clad material of the present invention has the advantage of low anisotropy with respect to mechanical strength.

Figure 2A:
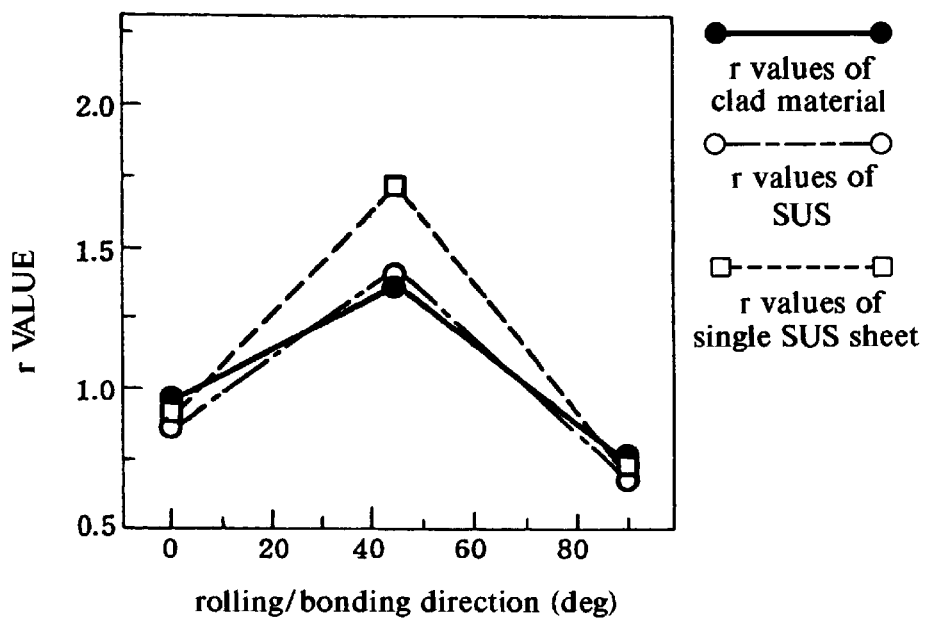
FIG. 2A depicts measurements obtained following final annealing, and FIG. 2B those obtained following cold rolling at a rolling reduction of 25%.
Figure 2B:
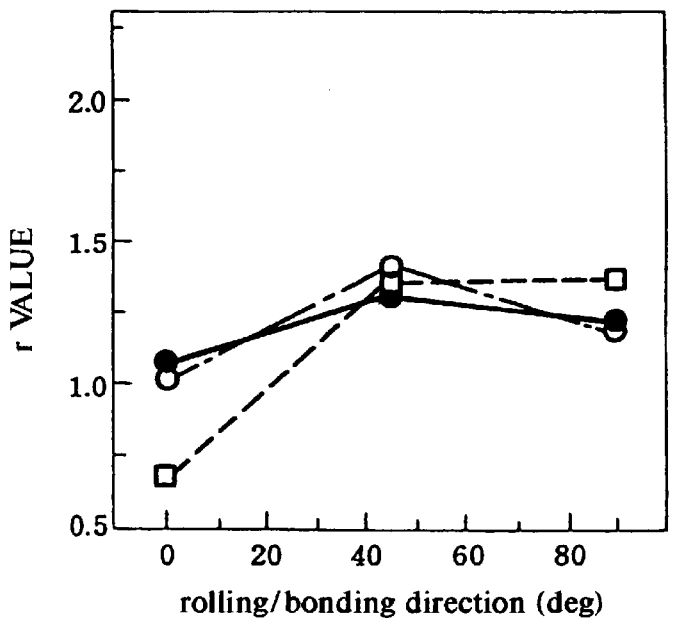
FIG. 2 is a graph depicting the relation between the r value and the angle with respect to the rolling/bonding direction, where

The vertical axes of the graphs in FIGS. 2A and 2B indicate the r value, and the horizontal axes indicate the angle with respect to the rolling/bonding direction (the angle of the direction parallel to the rolling/bonding direction is assumed to be 0° (deg.)). The thick solid lines between the black circles indicate the r values of the clad material, the dashed lines between the white circles indicate the r values of SUS, which is the metal substrate obtained by removing copper and nickel (metal claddings) from the clad material by etching them with an acid, and the broken lines between the white squares indicate the r values of the single SUS sheet. FIG. 2A depicts measurements obtained following final annealing, and FIG. 2B those obtained following cold rolling at a rolling reduction of 25%.

The samples for measuring the r values had the following measurements: a gage length of 50 mm, a width of 12.5 mm, and thicknesses of 0.2 mm (following final annealing) and 0.15 mm (following cold rolling at a rolling reduction of 25%). Measurements were conducted at an elongation of 5% in the manner described above.

It follows from FIG. 2A that the r value produced by final annealing is high in the direction in which the angle is 45° with respect to the rolling/bonding direction and that this trend is particularly pronounced in the single SUS sheet. The non-uniformity (maximum difference) of the r values is 0.6 or greater, and about 1 for a single SUS sheet.

It follows from FIG. 2B that the r value following cold rolling at a rolling reduction of 25% is high not only in the direction in which the angle is 45° with respect to the rolling/bonding direction, but also in the 90° direction. This trend is pronounced in a single SUS sheet, and the drop is particularly noticeable in the rolling/bonding direction (0° direction). The non-uniformity (maximum difference) of the r values is about 0.3 in a clad material, and about 0.7 in a single SUS sheet.

To confirm the effect of a metal cladding on a clad material, r values were measured after the copper and nickel clad materials had been etched off, leaving the SUS metal substrate alone. It was possible to confirm that the r values did not differ much under conditions corresponding to the use of a clad material.

It follows from these graphs that the non-uniformity of the r values in the clad material of the present invention is less than that of a clad material subjected to final annealing. It can also be seen that the non-uniformity is 1.0 or greater in the rolling/bonding direction (0° direction), where the r value is the lowest.

Consequently, it can be confirmed that the clad material of the present invention is advantageous in the sense of making it possible to fabricate nearly-round cases of low plastic anisotropy while preventing cracks, ruptures, or the like from forming during drawing.

The above-described effect is more pronounced than in the case of a single SUS sheet, and it can be demonstrated that the features of the present invention can be found only in clad materials.

Figure 3:
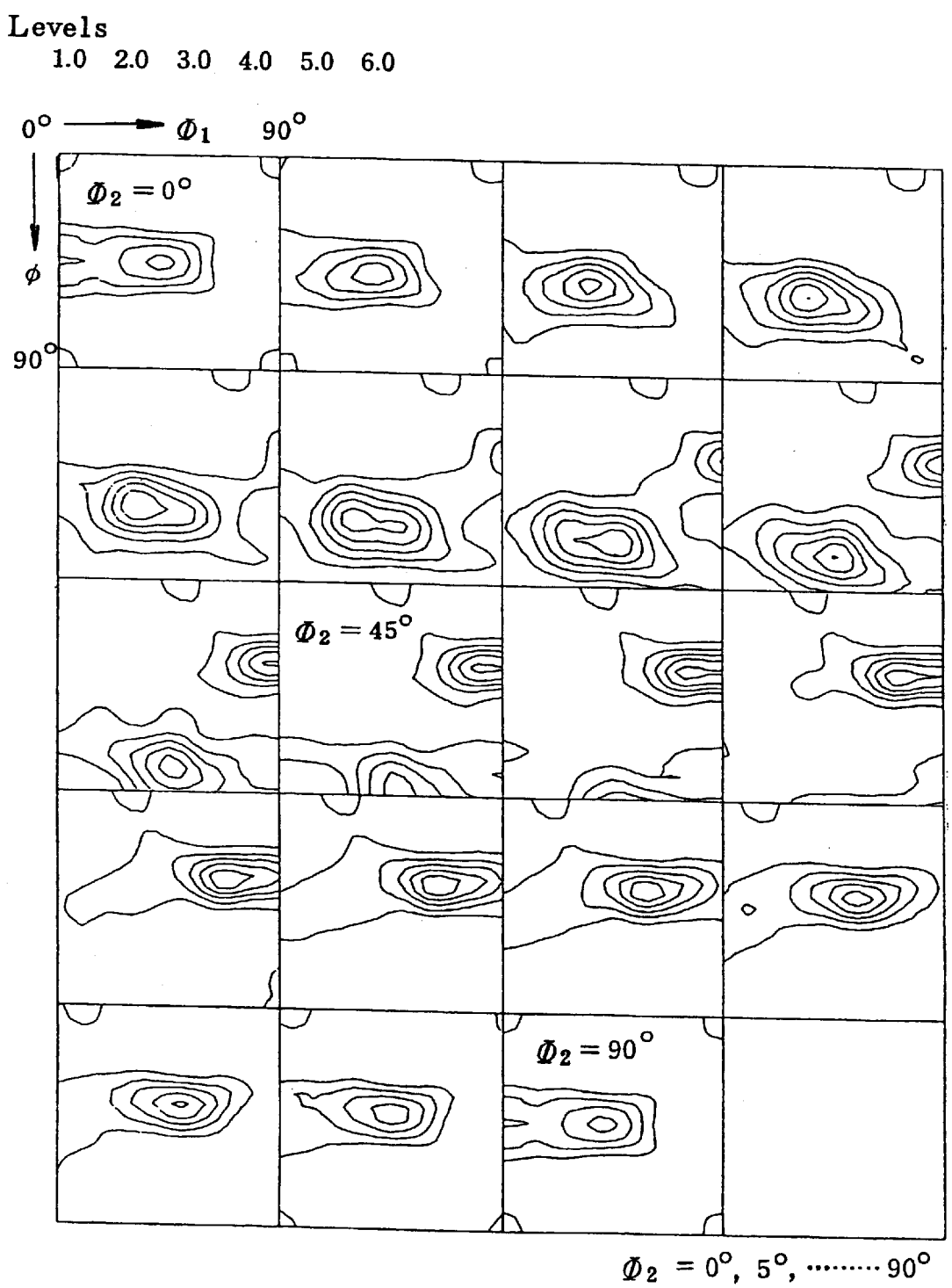
FIG. 3 is a graph depicting the crystal orientation distribution function (ODF) of the clad material cold-rolled at a rolling reduction of 25%.
Figure 4:
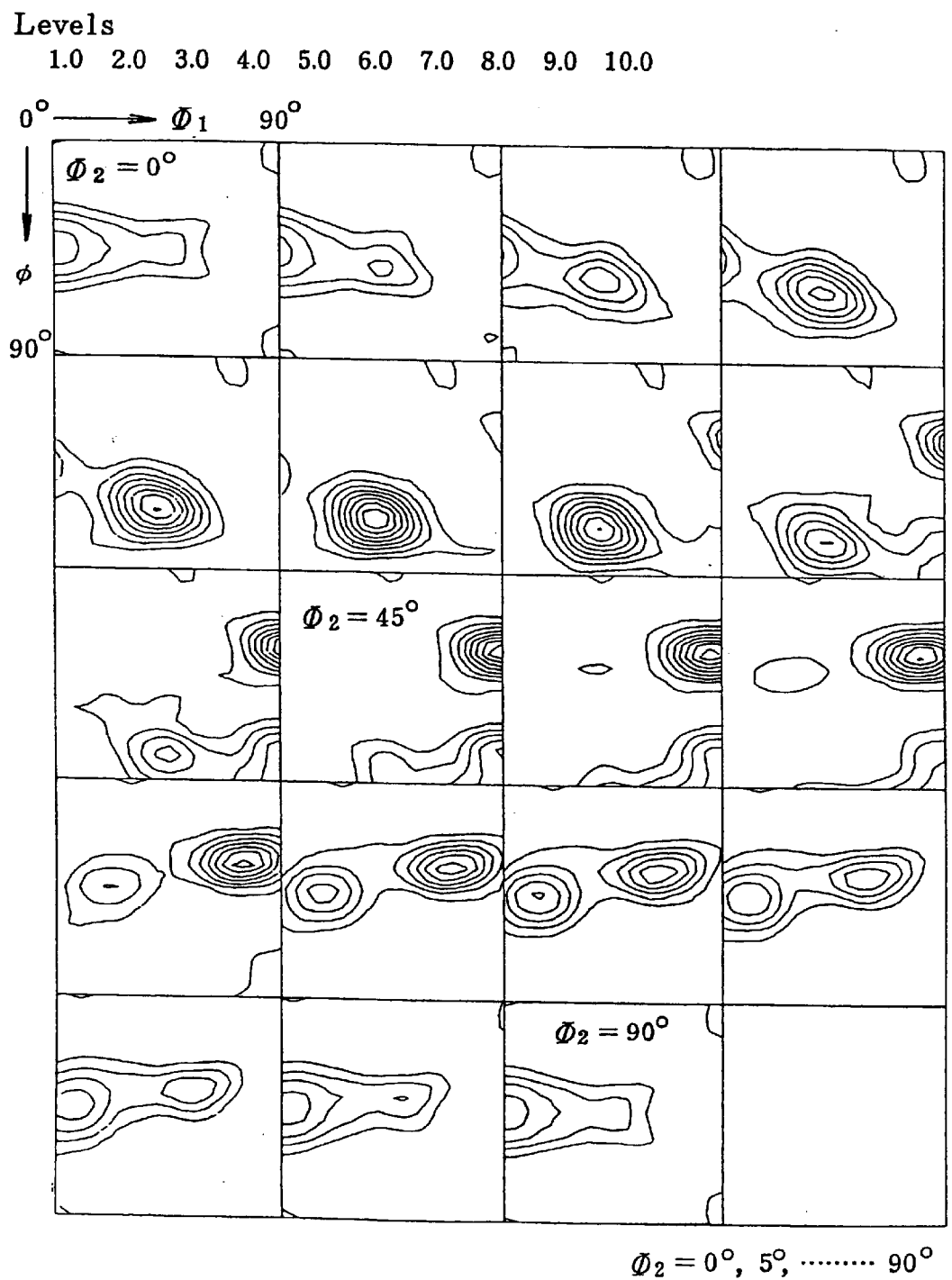
FIG. 4 is a graph depicting the crystal orientation distribution function (ODF) of a single SUS sheet.

FIGS. 3 and 4 are crystal orientation distribution functions (ODFs) calculated by series expansion based on surface harmonics, using incomplete pole figures (reflection-method $\alpha_{max}$=75°) for the {111}, {100}, {110}, and {311} orientations of a single SUS sheet (FIG. 4) and a clad material (FIG. 3) cold-rolled at a rolling reduction of 25%. Euler angle notation is in accordance with the Bunge definition.

Figures 7A, 7B:
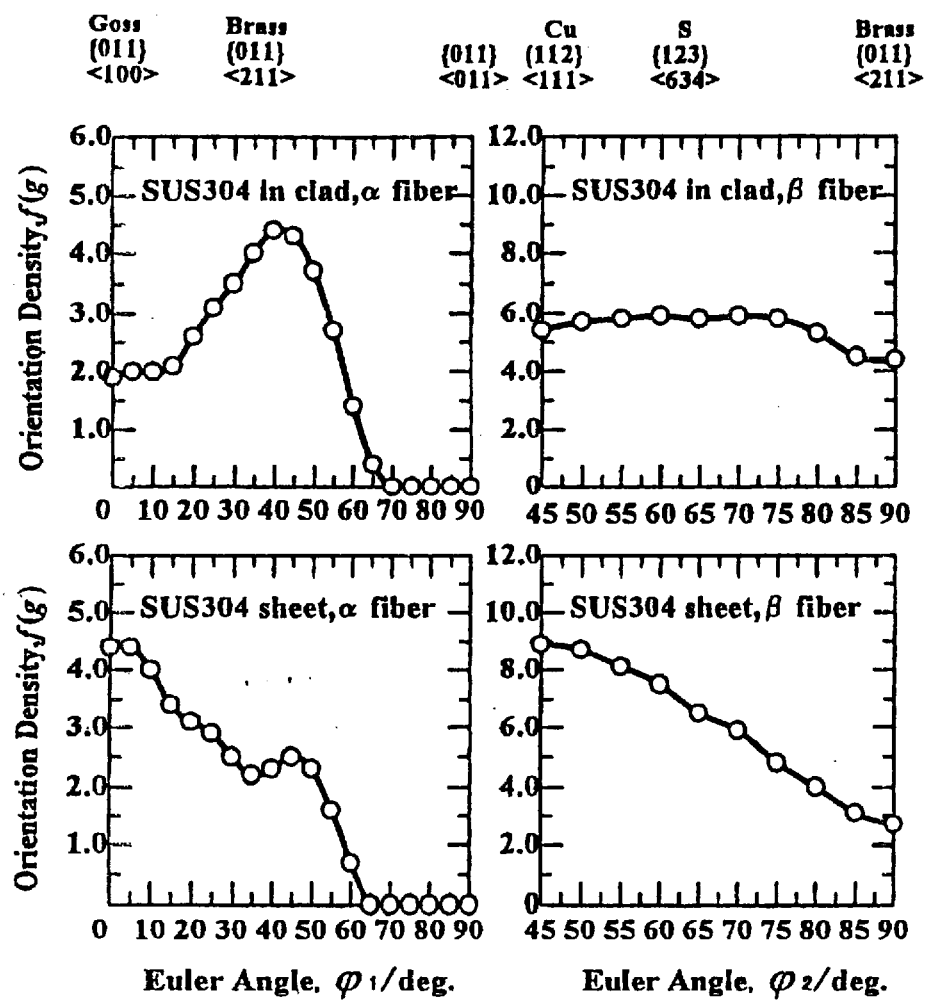
FIG. 7A depicts the α-fiber and β-fiber of an SUS clad material.
FIG. 7B depicts the α-fiber and β-fiber of a single SUS sheet.

The drawings indicate the present of β-fibers all the way from the copper {112}<111>orientation to the Bs {011}<211>orientation through the S {123}<634>orientation for both the clad material and the single SUS sheet. Although some α-fibers or weak cubic orientation could also be perceived, it was confirmed that the Goss {110}<100>-oriented accumulation was about twice as strong for the clad material, particularly when a single SUS sheet was involved. In other words, it is clear that FIG. 7A depicts the relation between the Euler angle and the orientation density for an SUS304 clad material, and FIG. 7B depicts the same relation for a single SUS sheet.

In addition, the r value is high in the direction in which the angle with respect to the rollingfbonding direction is 90°, and low in the 0° direction. The tendency of the Goss-oriented accumulation to increase is more pronounced for the single SUS sheet. It can thus be assumed that the non-uniformity of r values is considerable for a single SUS sheet and, in particular, the r value is very low in the rolling/bonding direction (0° direction).

Figure 5:
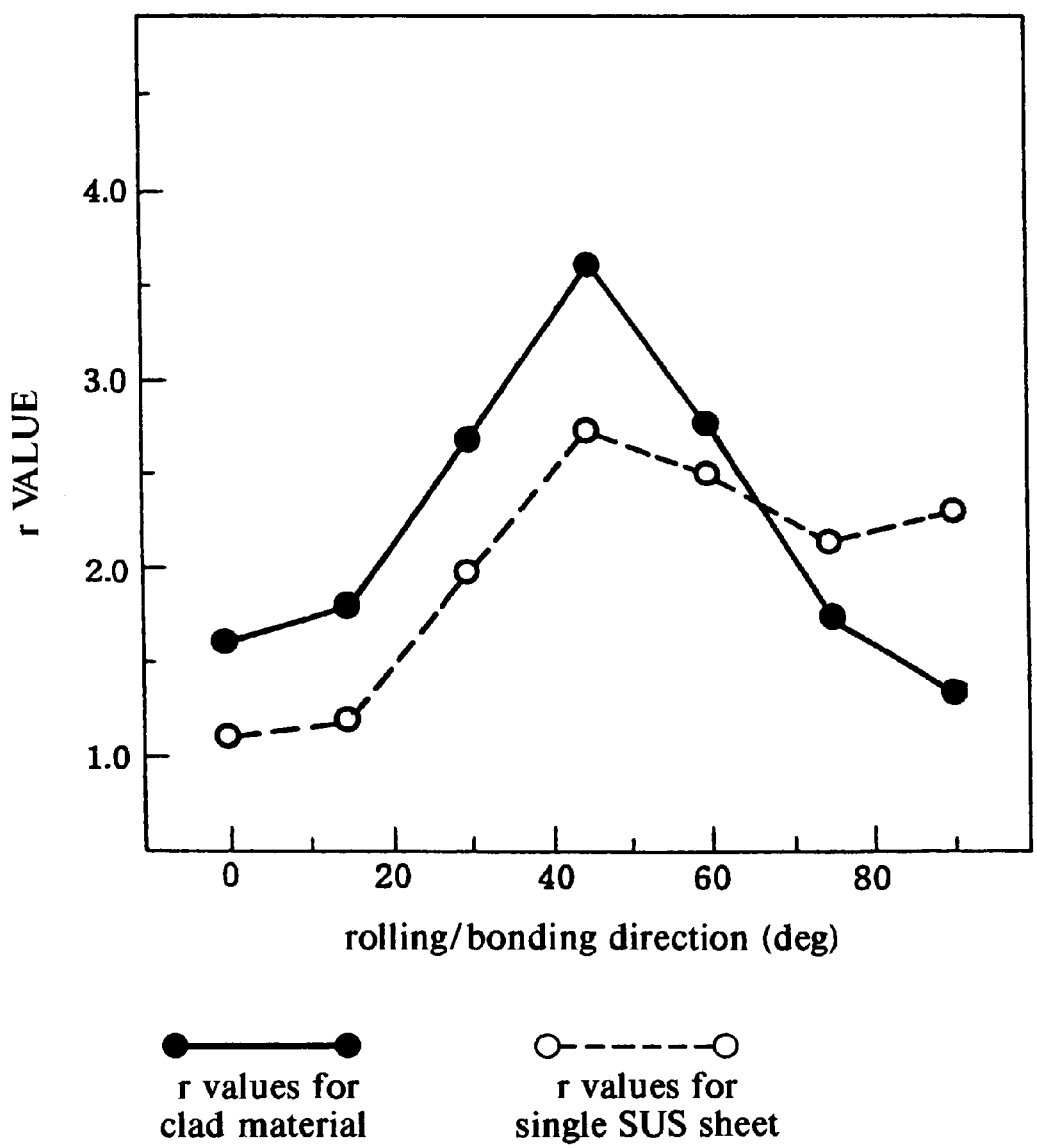
FIG. 5 is a graph depicting the relation between the r value and the angle with respect to the rolling/bonding direction, obtained using a method for estimating the r values of a polycrystalline material from ODF on the basis of the Taylor theory proposed by Bunge.

FIG. 5 depicts results obtained by calculating r values from the aforementioned ODFR, that is, results obtained using a method for estimating the r values of a polycrystalline material from an ODF on the basis of the Taylor theory proposed by Bunge. In the drawing, the thick solid lines between the black circles indicate the r values calculated for a clad material, and the broken lines between the white circles indicate the r values calculated for a single SUS sheet. The r values thus calculated are relatively high and can be demonstrated to be in satisfactory qualitative agreement with measured values.

Embodiment 2

An SUS metal substrate and copper and nickel metal claddings were prepared in the same manner as in Embodiment 1; and Cu/SUS/Ni clad materials with a thickness of 0.15 mm were fabricated by performing cold rolling/bonding, homogenization, cold rolling, and final annealing, followed by cold rolling under variable rolling reduction (0~35%).

Figure 6:
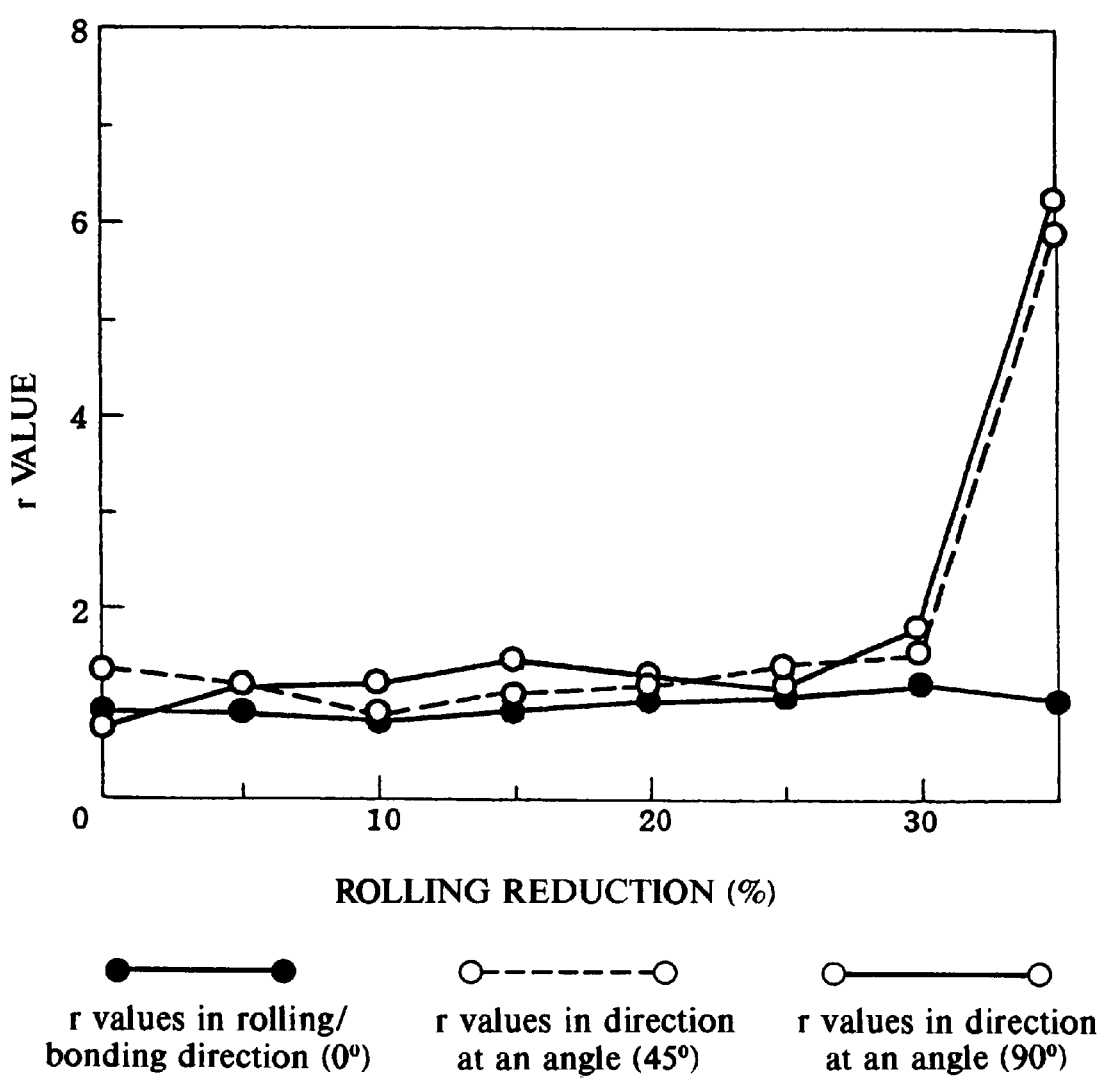
FIG. 6 is a graph depicting the relation between the r value and the rolling reduction of the clad material.

The r values of the clad materials obtained under variable rolling reduction were measured by the same method as in Embodiment 1. The results are shown in FIG. 6. In the graph shown in FIG. 6, the vertical axis indicates the r values; the horizontal axis, rolling reduction.

In the drawing, the solid lines between the solid circles indicate the r values in the rolling/bonding direction (0° direction), the broken lines between the white circles indicate the r values in the direction at an angle of 45° to the rolling/bonding direction of the clad materials, and the solid lines between the white circles indicate the r values in the direction at an angle of 90° to the rolling/bonding direction of the clad materials.

It can be seen in FIG. 6 that the non-uniformity (maximum difference) in the r values in the rolling/bonding direction (0° direction), the 45° direction, and the 90° direction is less than 0.6, and all the r values are 0.7 or greater when the rolling reduction is no more than 30%. When the rolling reduction is 35%, the r values increase as such and become highly non-uniform.

The fact that the non-uniformity of r values again increases when the rolling reduction is near 0% suggests that the rolling reduction should be kept at 30% or lower, preferably 5~30%, and ideally 5~25%, in order to attain the object of the present invention.

Embodiment 3

To evaluate the drawability of the proposed clad material, an SUS metal substrate and copper and nickel metal claddings were prepared; cold rolling/bonding, homogenization, cold rolling, and final annealing were performed; cases measuring 5 mm in outside diameter and 7 mm in height were fabricated using a Cu/SUS/Ni clad material (thickness: 0.3 mm) cold-rolled at a rolling reduction of 25%, a single SUS sheet (thickness: 0.3 mm) cold-rolled at a rolling reduction of 25%, and a Cu/SUS/Ni clad material (thickness: 0.3 mm) cold-rolled at a rolling reduction of 35%; and cracking, rupturing, and roundness were measured. The results are snown in Table 1.

It follows from Table 1 that the clad material of the present invention can yield near-round cases having minimal reduction anisotropy.

TABLE 1

| Material (thickness ratio (%)) | Rolling reduction | Drawability | Roundness |
|---|---|---|---|
| Cu/SUS/Ni(16/82/2) | 25% | Good | 5 μm |
| Single SUS sheet | 25% | Fair | 12 μm |
| Cu/SUS/Ni(16/82/2) | 35% | Fair | 15 μm |

Embodiment 4

To evaluate the drawability of the proposed clad material, an SUS metal substrate and copper and nickel metal claddings were prepared; cold rolling(bonding, homogenization, cold rolling, and final annealing were performed; cases measuring 5 mm in outside diameter and 7 mm in height were fabricated using a Cu/SUS/Ni clad material (thickness: 0.15 mm) cold-rolled at a rolling reduction of 25%, a single SUS sheet (thickness: 0.15 mm) cold-rolled at a rolling reduction of 25%, and a Cu/SUS/Ni clad material (thickness: 0.15 mm) cold-rolled at a rolling reduction of 35%; and cracking, rupturing, and roundness were measured. The results are shown in Table 2.

It follows from Table 2 that the clad material of the present invention can yield near-round cases having minimal reduction anisotropy.

TABLE 2

| Material (thickness ratio (%)) | Rolling reduction | Drawability | Roundness |
|---|---|---|---|
| Cu/SUS/Ni(16/82/2) | 25% | Good | 6 μm |
| Single SUS sheet | 25% | Fair | 15 μm |
| Cu/SUS/Ni(16/82/2) | 35% | Rupturing occurred | — |

Embodiment 5

To evaluate the drawability of the proposed clad material, an SUS metal substrate and a nickel metal cladding were prepared; cold rolling/bonding, homogenization, cold rolling, and final annealing were performed; cases measuring 5 mm in outside diameter and 7 mm in height were fabricated using an NVlSUS clad material (thickness—0.15 mm) cold-rolled at a rolling reduction of 25%, a single SUS sheet (thickness: 0.15 mm) cold-rolled at a rolling reduction of 25%, and an Ni/SUS clad material (thickness: 0.15 mm) cold-rolled at a rolling reduction of 35%; and cracking, rupturing, and roundness were measured. The results are shown in Table 3.

It follows from Table 3 that the clad material of the present invention can yield near-round cases having minimal reduction anisotropy.

TABLE 3

| Material (thickness ratio (%)) | Rolling reduction | Drawability | Roundness |
|---|---|---|---|
| Ni/SUS/(5/95) | 25% | Good | 8 μm |
| Single SUS sheet | 25% | Fair | 15 μm |
| Ni/SUS/(5/95) | 35% | Rupturing occurred | — |

Embodiment 6

To evaluate the drawability of the proposed clad material, an SUS metal substrate and copper and nickel metal claddings were prepared; cold rolling/bonding, homogenization, cold rolling, and final annealing were performed; cases measuring 5 mm in outside diameter and 7 mm in height were fabricated using a Cu/SUS/Ni clad material (thickness: 0.1 mm) cold-rolled at a rolling reduction of 25%, a single SUS sheet (thickness: 0.1 mm) cold-rolled at a rolling reduction of 25%, and a Cu/SUS/Ni clad material (thickness: 0.1 mm) cold-rolled at a rolling reduction of 35%; and cracking, rupturing, and roundness were measured. The results are shown in Table 4.

It follows from Table 4 that the clad material of the present invention can yield near-round cases having minimal reduction anisotropy.

TABLE 4

| Material (thickness ratio (%)) | Rolling reduction | Drawability | Roundness |
|---|---|---|---|
| Cu/SUS/Ni(7/91/2) | 25% | Good | 8 μm |
| Single SUS sheet | 25% | Repturing occurred | — |
| Cu/SUS/Ni(7/91/2) | 35% | Rupturing occurred | — |

Embodiment 7

To evaluate the drawability of the proposed clad material, an SUS metal substrate was prepared, as was nickel overlaid as a metal cladding on the two principal surfaces of the metal substrate; cold rolling/bonding, homogenization, cold rolling, and final annealing were performed; cases measuring 5 mm in outside diameter and 7 mm in height were fabricated using an Ni/SUS/Ni clad material (thickness: 0.1 mm) cold-rolled at a rolling reduction of 25%, a single SUS sheet (thickness: 0.1 mm) cold-rolled at a rolling reduction of 25%, and an Ni/SUS/Ni clad material (thickness: 0.1 mm) cold-rolled at a rolling reduction of 35%; and cracking, rupturing, and roundness were measured. The results are shown in Table 5.

It follows from Table 5 that the clad material of the present invention can yield near-round cases having minimal reduction anisotropy.

TABLE 5

| Material (thickness ratio (%)) | Rolling reduction | Drawability | Roundness |
| --- | --- | --- | --- |
| Ni/SUS/Ni(2/96/2) | 25% | Good | 9 μm |
| Single SUS sheet | 25% | Rupturing occurred | — |
| Ni/SUS/Ni(2/96/2) | 35% | Cracking | — |

INDUSTRIAL APPLICABILITY

The embodiments described above demonstrate that the clad material obtained in accordance with the present invention has excellent drawability and exceptional tensile strength and other metal substrate characteristics, and can thus be used for the anode cases or cathode cases of button-type microbatteries and other miniature electronic devices requiring the use of comparatively thin, drawable sheets.

The material also has excellent weldability, corrosion resistance, and other merits. The clad material of the present invention can be used not only in the aforementioned battery cases but also in quartz oscillators similar in shape and size to battery cases, and in various other electronic components, and hence has very high commercial value.

What is claimed is:

1. A clad material formed by rolling/bonding a metal cladding to at least one principal surface of a metal substrate in a rolling/bonding direction, wherein the maximum difference between the Lankford values (r values, measured under 5% elongation) expressing the plastic anisotropy between the rolling/bonding direction, a direction at 45° to the rolling/bonding direction, and a direction at 90° to the rolling/bonding direction, is less than 0.6.

2. The clad material as defined in claim 1, wherein the r values that express the plastic anisotropy between the rolling/bonding direction, a direction at 45° to the rolling/bonding direction, and a direction at 90° to the rollingfbonding direction are greater than 0.7.

3. The clad material as defined in claim 1, wherein the thickness of the entire material is 0.5 mm or less.

4. The clad material as defined in claim 3, wherein the thickness of the metal cladding is between 2 and 20% of the thickness of the metal substrate.

5. The clad material as defined in claim 1, wherein the metal substrate is stainless steel, and the Goss {110}<100>-oriented accumulation in the plane in which bonding with the metal cladding is achieved is less than that observed when no metal cladding is rolled/bonded.

6. The clad material as defined in claim 5, wherein the metal cladding is at least one material selected from the group consisting of copper and nickel.

7. A method for manufacturing a clad material comprising the step of cold rolling at a rolling reduction of 30% or lower a metal cladding to at least one principal surface of a metal substrate, and wherein a maximum difference between Lankford values (r values measured under 5% elongation) which express plastic anisotropy between a rolling/bonding direction and directions at 45° thereto and 90° thereto is less than 0.6.

8. The method for manufacturing a clad material as defined in claim 7, wherein the rolling reduction of cold rolling is 5~25%.

9. The clad material as defined in claim 2, wherein the thickness of the entire material is set to 0.5 mm or less.

* * * * *